UNITED STATES PATENT OFFICE.

FREDERIC J. SMITH, OF ELIZABETH, NEW JERSEY, ASSIGNOR TO WILLIAM H. BOWKER, OF BOSTON, MASSACHUSETTS.

COATED CHEMICALLY-ACTIVE SUBSTANCE AND METHOD OF MAKING SAME.

SPECIFICATION forming part of Letters Patent No. 714,960, dated December 2, 1902.

Application filed June 5, 1901. Renewed May 9, 1902. Serial No. 106,636. (No specimens.)

*To all whom it may concern:*

Be it known that I, FREDERIC J. SMITH, a citizen of the United States, residing at Elizabeth, in the county of Union and State of New Jersey, have invented certain new and useful Improvements in Coated Chemically-Active Substances and Methods of Making the Same, of which the following is a specification.

My invention has for its object the treatment of chemically-active substances whereby when in comminuted form their particles shall be isolated from or protected against the chemical effect of any surrounding or contiguous medium, as the atmosphere, active chemicals, &c., and also whereby they may be mechanically combined with other substances, producing mixtures wherein the action or chemical reactions of the comminuted substances may be retarded or postponed until the time and under the circumstances desired. One class of substances to be thus treated may be described as those which are strongly basic, as the oxid and hydroxids of the alkali and alkaline-earth group of metals, together with their salts, which possess alkaline properties. This class of substances would include such compounds as caustic or burnt lime, carbonate of potassium, "Thomas slag," so called, anhydrous carbonate of soda, &c.

My improved method of treating substances when in comminuted form consists, broadly, in coating or surrounding the comminuted particles with a soluble fused salt, which, while inert relatively to the comminuted particle and impervious to or uninfluenced by certain external and surrounding agencies, shall be susceptible of being dissolved when desired in water in such a manner as to permit the comminuted particles thereafter to act alone or under the influence of surrounding or adjacent media or to react with such surrounding or adjacent media.

I will now proceed to describe somewhat in detail the preferred method of employing my process in the treatment of comminuted caustic or burnt lime, such being taken as a typical case.

The caustic lime having been comminuted to the desired fineness, preferably so as to pass through a forty-mesh sieve, a quantity of a soluble fusible salt, preferably nitrate of soda, is placed in a suitable heating device and its temperature is raised to the melting-point. In the case of nitrate of soda when thus melted it will be in the form of a limpid liquid. To this liquid I then add with constant stirring a quantity of comminuted lime. I have found in practice that in carrying out my invention with reference to the production of protected comminuted lime to be employed in a mechanical mixture with comminuted blue vitriol to form the well-known Bordeaux mixture in dry form four parts of nitrate of soda should be mixed with three parts, by weights, of the comminuted lime. The heating and stirring are continued, care being taken not to overheat until a uniform plastic or semifluid mass results. It should be noted that if the mixture be overheated a chemical reaction will ensue, which will destroy the caustic properties of the lime and decompose the nitrate of soda. After the heated mass has become sufficiently mixed it is withdrawn from the source of heat in any suitable manner and spread upon a suitable surface—such as a shallow sheet-iron pan, upon which it is allowed to cool. When cool, the mass will form a hard brittle cake, wherein the particles of comminuted lime will be found to be practically hermetically sealed or incased in a skin or envelop of nitrate of soda, these in turn being held together by the same medium, forming a mass which may be broken, crushed, or ground to any desired size. One of the purposes for which I wish to make use of this coated lime is the preparation of a commercial dry Bordeaux mixture which shall possess all the properties of the freshly-prepared article. The usual method of preparing the Bordeaux mixture now practiced is to make a water solution of blue vitriol; also, a separate solution of caustic or slaked lime and water, commonly known as "milk of lime," and to then mix the two together, after which the mixture is ready for use. In the making of Bordeaux mixture it is necessary to have the lime present in its highly-caustic state—*i e.*, freshly burnt and water-slaked—in order that it may quickly react on the blue vitriol, and I have discovered that by coating the caustic or burnt lime in comminuted form, as above described, its original basic properties are preserved and that it can be safely mixed with comminuted blue vitriol without any material reactions until it is desired to use the mixture, when it is only necessary to add water and the proper reaction will take place. In consequence a mixture is thus produced in which copper hydroxid and sulfate of lime will exist in the same condition as in the Bordeaux mixture as ordinarily freshly prepared and in which the precipitated compounds will be found sufficiently free from gritty particles that they may be conveniently applied as a spray through a nozzle or in any other manner. It has also been long recognized that substances strongly basic—such as burnt lime, (CaO,) carbonate of potash, &c., are desirable substances to apply to the soil; but it has been impossible to apply them in a powdered state and preserve at the same time their full causticity, which fact particularly applies to lime. Comminuted burnt lime and comminuted carbonate of potash treated according to my invention can be readily transported and applied to the soil broadcast or by machines without loss of their valuable basic properties when the moisture of the soil will dissolve the coating and the desired reactions take place. It has also been observed that valuable fertilizing mixtures could be made with burnt lime or carbonate of potash if these materials could be incorporated in such mixtures without the loss of their basic properties or reacting on the other substances with which they are mixed. By my invention common burnt lime or carbonate of potash can be comminuted and coated as above described and then readily mixed with nitrogenous substances, such as dried blood and sulfate of ammonia, both carrying ammonia without causing any reaction whereby the ammonia would be liberated, as would be the case if these basic substances above referred to were mixed with these ingredients without any coating, and similarly these same alkalies coated as above described could be mixed with other potash salts and water-soluble phosphates without producing any serious reaction or reversion. The preparations would vary with the requirements of different soils or different crops.

I have discovered that by my invention coated alkalies in a comminuted form may be used in the preparation of mixed fertilizers and sold and applied in powdered form, which has never been done successfully before. In fact, a comminuted coated substance treated according to my invention is well adapted for use in any of the commercial arts where the coating material would not be objectionable.

It must be borne in mind that the preparation and details of treatment above set forth are those which I have found most advantageous when lime is the basic substance handled. These details must vary with the particular substance to be coated and the particular salt selected for coating. It is further obvious that the fusible salt employed for the coating should have a point of fusion lower than that of the substance to be coated.

I claim—

1. The improvement in the art of treating a chemically-active substance for the purpose of regulating its time and manner of chemical action and reaction which consists in comminuting said substance, mixing the comminuted particles thereof with a fused salt, soluble in water and not reacting with the substance to be treated, and allowing the mixture to cool.

2. As a new product a chemically-active substance in comminuted form, the particles of which are coated with a salt applied in a fused state to them and subsequently cooled, said salt not reacting chemically with the coated substance and being soluble in water.

3. As a new product, a basic substance in comminuted form, the particles of which are coated with a salt applied in a fused state to them, and subsequently cooled, said salt not reacting chemically with the coated substance and being soluble in water.

4. As a new product, a basic substance in comminuted form, the particles of which are coated with a salt applied in a fused state to them, and subsequently cooled, said salt being soluble in water not reacting with the coated substance, and inert when mixed with blue vitriol.

5. As a new product, a basic substance in comminuted form, the particles of which are coated with a salt applied in a fused state to them, and subsequently cooled, said salt not reacting with the coated substance being soluble in water, and inert when mixed with such fertilizing ingredients as nitrogenous matters, potash salts and soluble phosphates.

In testimony whereof I have hereunto subscribed by name this 14th day of May, 1901.

FREDERIC J. SMITH.

Witnesses:
HENRY J. MILLER,
HANNAH N. F. MILLER.